No. 703,565. Patented July 1, 1902.
G. B. FARRELL.
CAR WHEEL.
(Application filed Jan. 20, 1902.)
(No Model.)
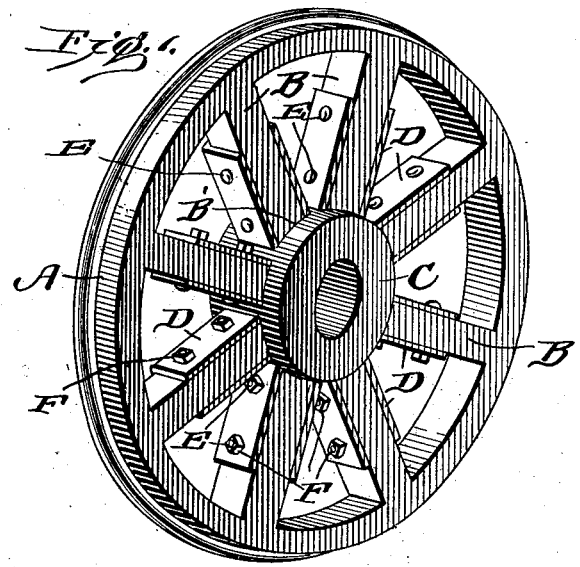
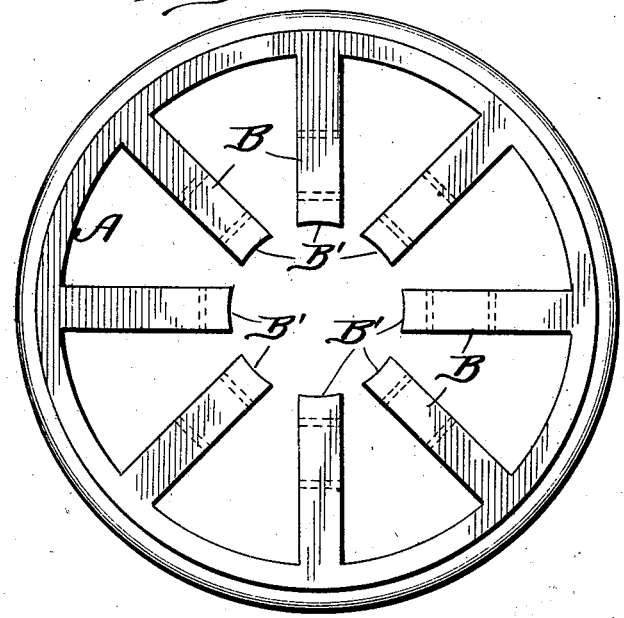
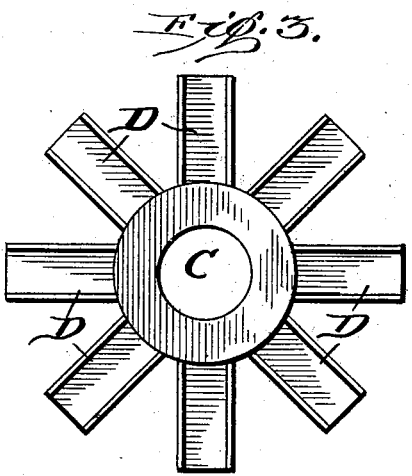
Witnesses
Allan Foose
Clarence Shaw
Inventor
George B. Farrell,
By
Murray Brock
Attorneys

UNITED STATES PATENT OFFICE.

GEORGE B. FARRELL, OF WILKESBARRE, PENNSYLVANIA.

CAR-WHEEL.

SPECIFICATION forming part of Letters Patent No. 703,565, dated July 1, 1902.

Application filed January 20, 1902. Serial No. 90,493. (No model.)

*To all whom it may concern:*

Be it known that I, GEORGE B. FARRELL, a citizen of the United States, residing at Wilkesbarre, in the county of Luzerne and State of Pennsylvania, have invented a new and useful Car-Wheel, of which the following is a specification.

This invention relates generally to car-wheels, and more particularly to a wheel intended for use upon mining-cars and the like.

The object of the invention is to provide a wheel in which the rim can be renewed whenever it becomes worn or damaged; and another object is to provide a wheel in which the hub can be renewed in case it should become worn or damaged.

With these objects in view the invention consists in the novel features of construction and combination hereinafter fully described, and pointed out in the claims.

In the drawings forming part of this specification, Figure 1 is a perspective view of a wheel constructed in accordance with my invention. Fig. 2 is a detail side view illustrating the rim and integral spokes. Fig. 3 is a side view illustrating the hub and the integral spoke-sockets; and Fig. 4 is a detail sectional view taken through one of the spokes and sockets, the fastening-bolt being shown in elevation.

In carrying out my invention I provide a rim A, which is constructed substantially the same as wheel-rims now in common use, except that the spokes B, formed integral with the arm, are made square in cross-section and extend only part of the way to the center, the ends B' being curved upon the arc of a circle in order to tightly bear upon the cylindrical surface of the hub C, said hub having a series of integral spoke-sockets D, shaped to receive the spokes B. Each spoke-socket has its sides perforated at two points to receive the fastening-bolts E, secured by nuts F. In this manner the hub, spokes, and rim are securely connected and held as rigid as though the wheel were formed from a single casting. In case, however, the rim or hub or any of the spokes should become damaged the wheel can be quickly and easily taken apart and a new hub or rim substituted and the wheel rebuilt.

Having thus fully described my invention, what I claim as new, and desire to secure by Letters Patent, is—

1. A wheel comprising a rim having integral spokes, and a hub having integral sockets adapted to receive spokes and means for securing said spokes within the sockets, as set forth.

2. A wheel consisting of a rim having integral spokes, and the hub having integral sockets adapted to receive the said spokes, the ends of the spokes bearing upon the exterior of the hub, substantially as shown and described.

3. A wheel comprising a rim having the integral spokes, the inner ends of which are curved upon the arc of a circle and a cylindrical hub having integral sockets adapted to receive the said spokes, the curved ends of said spokes resting upon the cylindrical surface of the hub, and means for securing the spokes within the sockets, substantially as shown and described.

GEORGE B. FARRELL.

Witnesses:
JAMES E. COSGROVE,
CHARLES HILBERT.